Oct. 21, 1941.  A. J. STOUGES ET AL  2,259,842

TYPOGRAPHICAL DISTRIBUTING MACHINE

Filed Nov. 30, 1940  7 Sheets-Sheet 4

INVENTORS
A. J. Stouges
J. H. Hiepman
BY
Moorman Kennedy & Campbell
ATTORNEYS

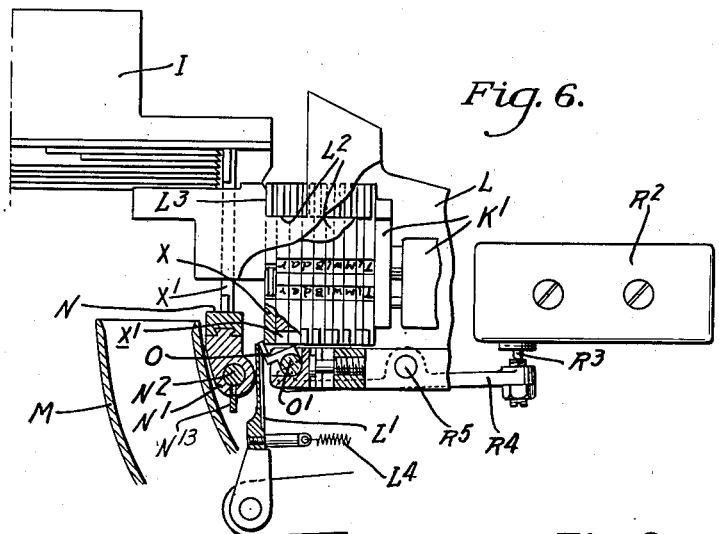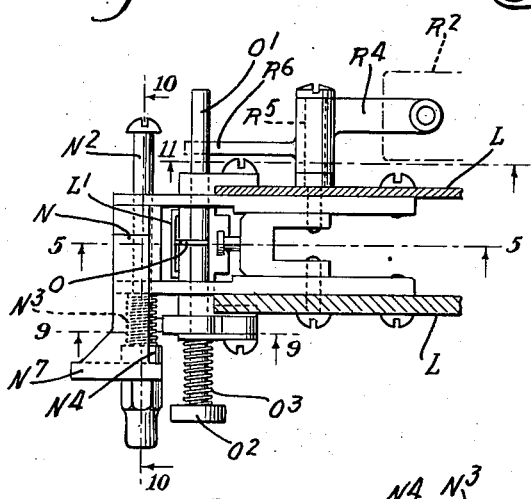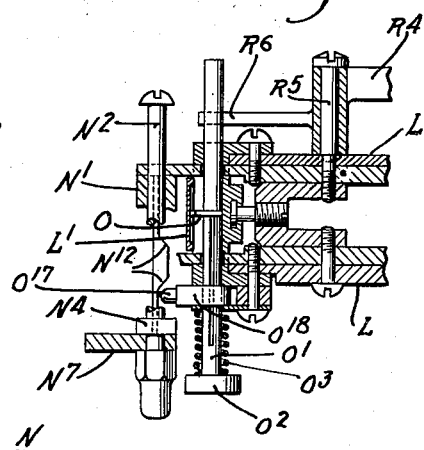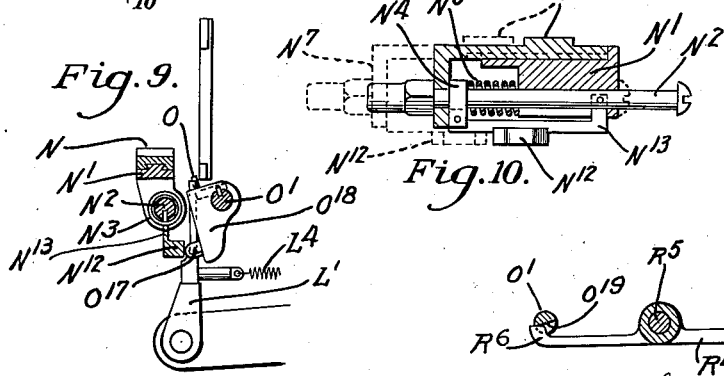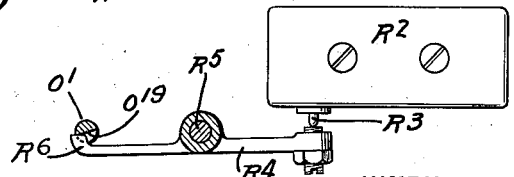

Oct. 21, 1941.  A. J. STOUGES ET AL  2,259,842
TYPOGRAPHICAL DISTRIBUTING MACHINE
Filed Nov. 30, 1940  7 Sheets-Sheet 6
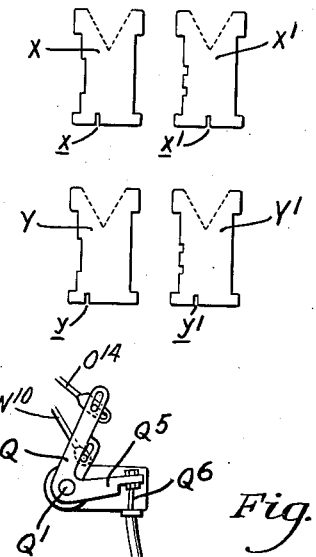
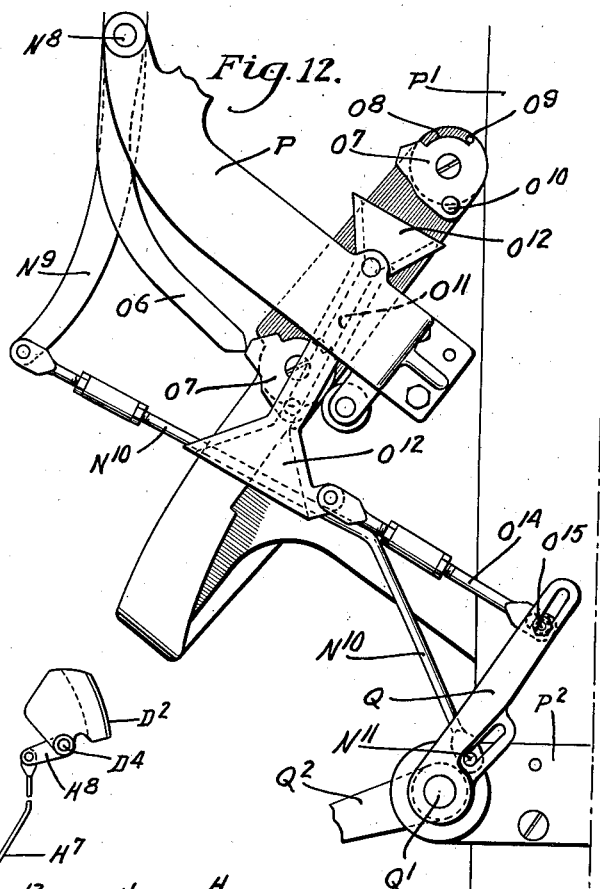
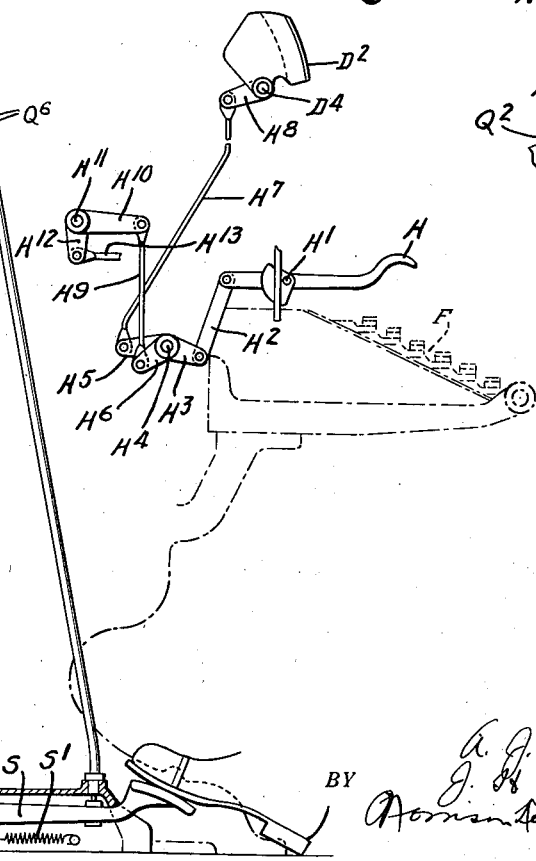
INVENTORS
BY
ATTORNEYS

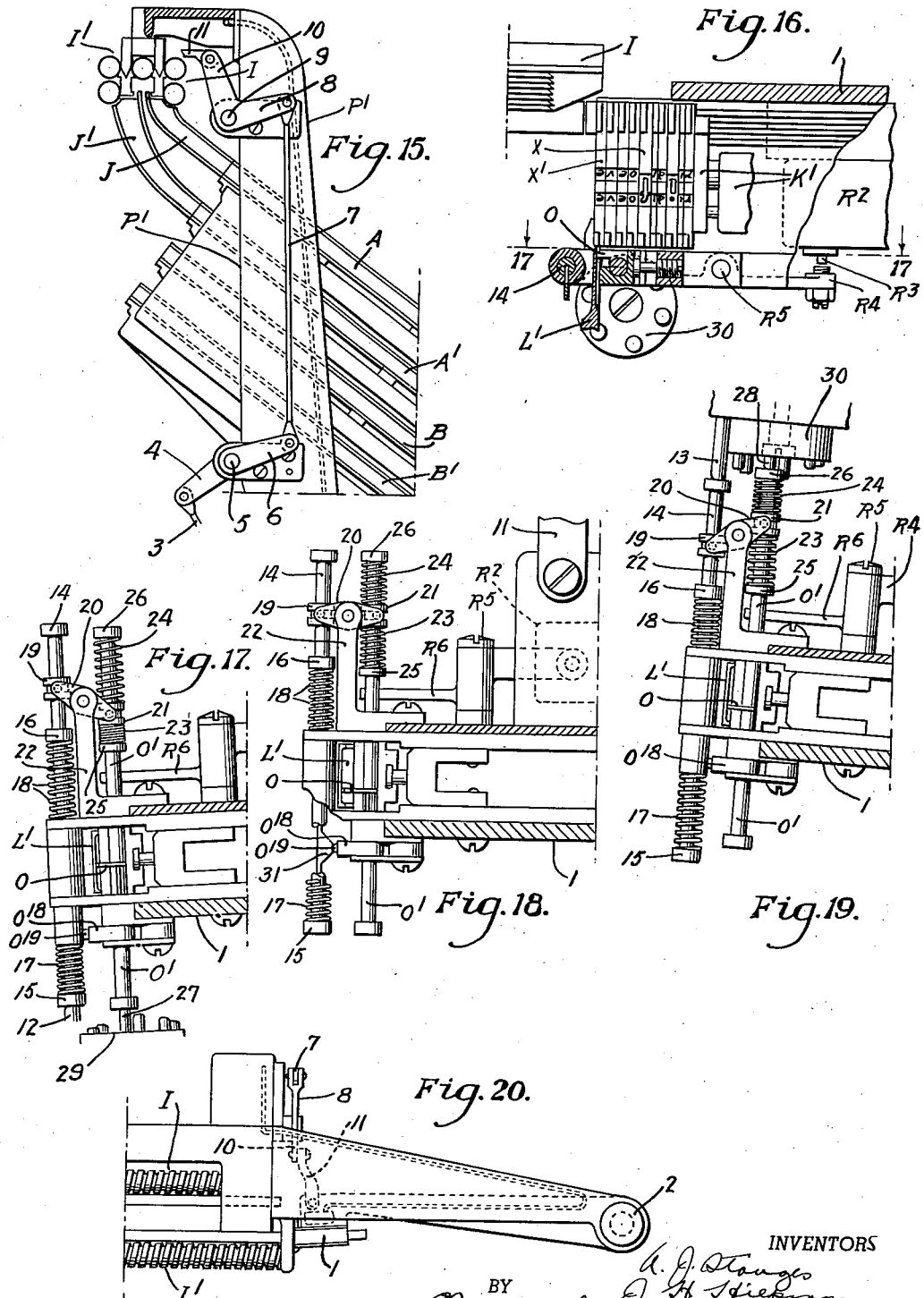

Patented Oct. 21, 1941

2,259,842

UNITED STATES PATENT OFFICE 2,259,842

TYPOGRAPHICAL DISTRIBUTING MACHINE

Anthony J. Stouges, Queens Village, and John H. Hilpman, Springfield Gardens, N. Y., assignors to Mergenthaler Linotype Company, a corporation of New York Application November 30, 1940, Serial No. 367,876

34 Claims. (Cl. 199—41)

This invention relates to typographical distributing machines of the general organization represented in U. S. Letters Patent No. 436,532 to O. Mergenthaler, wherein circulating matrices are released from a magazine in the order in which their characters are to appear in print and then composed in line, the composed line transferred to the face of a slotted mold, the mold filled with molten metal to form a slug or linotype against the matrices which produce the type characters thereon, and the matrices thereafter returned through distributing mechanism to the magazine from which they started.

More particularly, it relates to machines of the type required to handle ninety character matrix fonts suitable for the more usual composition or straight matter, as well as seventy-two character matrix fonts suitable for head letter and display work, etcetera. Certain machines of this type are equipped with two fixed main or character distributors, one for the ninety character fonts and the other for the seventy-two character fonts, and with means for selecting one distributor or the other according to which font is being used for composition, it being understood that the two different fonts are stored in different magazines and that the keyboard may be operatively connected to either magazine at the will of the operator. In other words, in such machines, a change from one magazine to the other effects a corresponding change of distributors. While such an arrangement is intended to insure that the matrices of the font in use will always be restored to their proper magazine, it actually does not have this effect, because the operator will sometimes shift from one magazine to the other without waiting until all previously composed lines (of which there may be several in course of circulation) have been distributed; and even if the operator does wait, the work of composition is slowed up and the output of the machine seriously curtailed. Moreover, such an arrangement forbids the mixing in the same line of matrices of the two different fonts, which is often desirable for special classes of work, as for example in connection with advertising matter.

The present improvements are intended to overcome the foregoing and other difficulties. To this end, specifically, the distributing mechanism is provided, as before, with adjustable means for directing the matrices to one distributor or the other according to the magazine in use, but, as a new departure, with concurrently adjustable means adapted under one condition of adjustment to permit the passage to the selected distributor of matrices of the corresponding font while preventing the passage thereto of matrices of the other font and under another condition of adjustment to permit the passage to the newly selected distributor of matrices of the second font while preventing the passage thereto of matrices of the first font, and so on with each change of distributor. Whenever the passage of matrices is prevented, the lifting finger which feeds the matrices to the distributors is thrown temporarily out of action and a signal is flashed before the operator to bring this to his attention, and the operator may then reverse the adjustment of the parts through an idle change of magazines or through a special foot treadle provided for the purpose, to cause the distributing mechanism to resume operation until another stoppage occurs and the signal repeated, whereupon the operator will again in like manner reverse the adjustment of the parts to carry on distribution. In many instances, the repeated shifting from one magazine to another in regular course of composition will in and of itself be enough to enable the distributing mechanism to operate continuously, but whenever this is not the case, the operator may instantly reverse the adjustment of the parts in the manner just described and thus keep up the operation of the distributing mechanism without any appreciable interruption.

Two different embodiments of the invention are herein shown and the construction and operation of the parts will best be understood from the detailed description to follow.

Referring to the drawings:

Fig. 6 is a similar view showing the font distinguisher out of register with the notch formed in the leading matrix and, as a result, rocked forward to throw the matrix lifting finger out of action and to close the switch of the electric signal;

Fig. 7 is a horizontal section taken on the line 7—7 of Fig. 5;

Fig. 8 is a horizontal section taken on the line 8—8 of Fig. 5;

Fig. 9 is a vertical section taken on the line 9—9 of Fig. 7;

Fig. 10 is a vertical section taken on the line 10—10 of Fig. 7;

Fig. 11 is a detail of the electric signal switch box, showing the switch closing lever as actuated by the forward rocking of the font distinguisher, as in Fig. 6;

Fig. 12 is a side elevation of certain portions of the actuating mechanism for the matrix supporting bridge and font distinguisher, the position of the parts being opposite to that shown in Figs. 1 and 2;

Fig. 13 is a detail depicting the foot treadle operation of the actuating mechanism for the matrix supporting bridge and font distinguisher;

Fig. 14 is a face view of four different forms of matrices such as are required to be distributed; and Figs. 15 to 20 represent a second embodiment of the invention wherein the matrices are directed to one distributor or the other by an adjustable distributor box carrying the font distinguisher, the matrix lifting finger and the signal box, the different views being as follows: Fig. 15 is a side elevation of the upper or distributing portion of the machine, showing in particular the connections for adjusting the distributor box; Fig. 16 is a rear view, partly in section and partly broken away, of the distributor box, showing the font distinguisher in register with the notch of the leading matrix; Fig. 17 is a horizontal section taken on the line 17—17 of Fig. 16 and showing the distributor box in one of its adjusted positions for cooperation with the rear distributor; Fig. 18 is a similar view but showing the distributor box in the midway position through which it passes during adjustment; Fig. 19 is a view similar to Fig. 17, but showing the distributor box in the other of its adjusted positions for cooperation with the front distributor; and Fig. 20 is a plan view of the distributing mechanism, showing the distributor box cooperating with the rear distributor or in the adjusted position shown in Fig. 17.

The embodiment shown in Figs. 1 to 14 will first be described.

Figure 1:
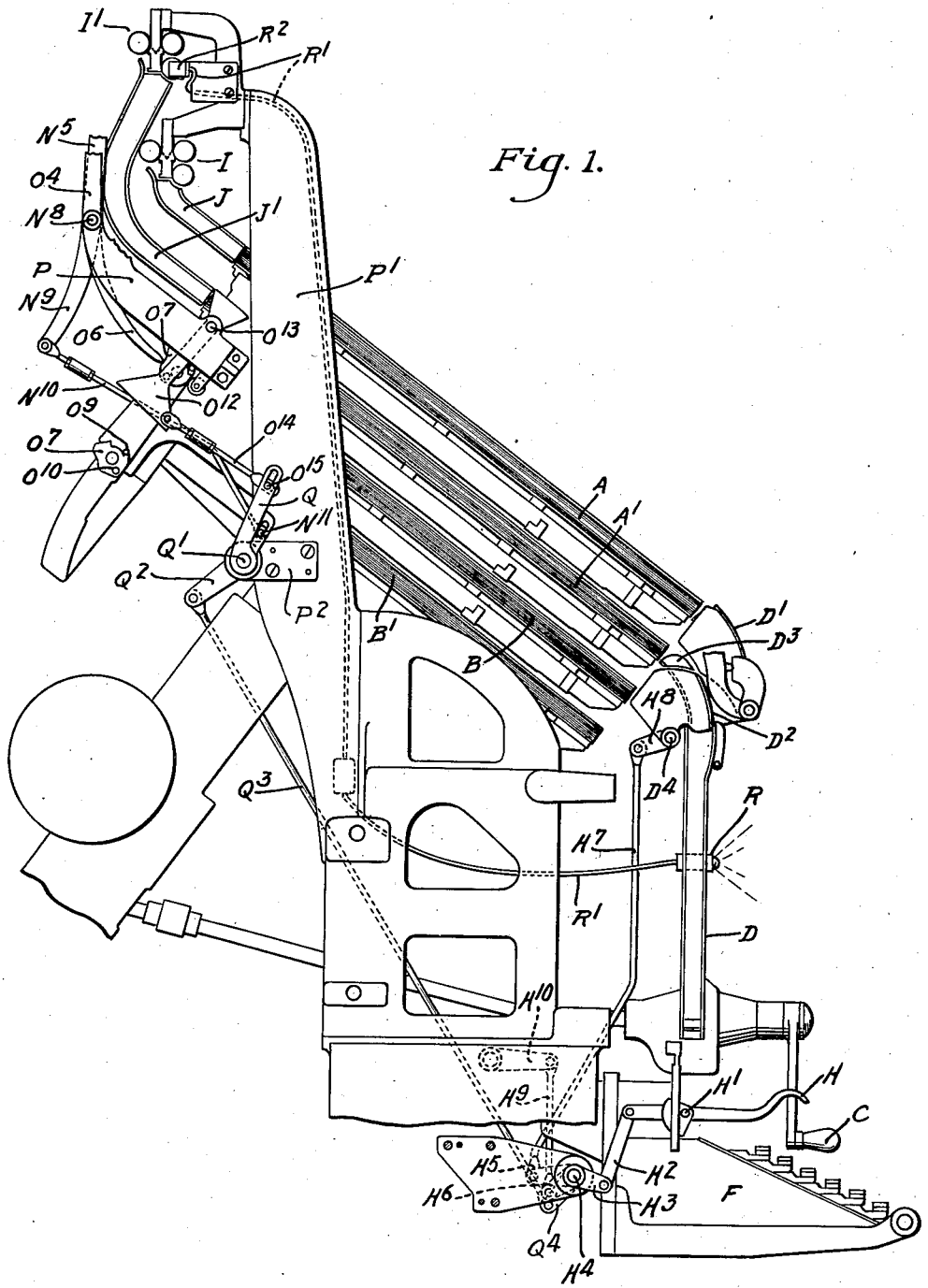
Fig. 1 is a side elevation, taken from the left, of a Linotype machine equipped with the present improvements.
Figure 3:
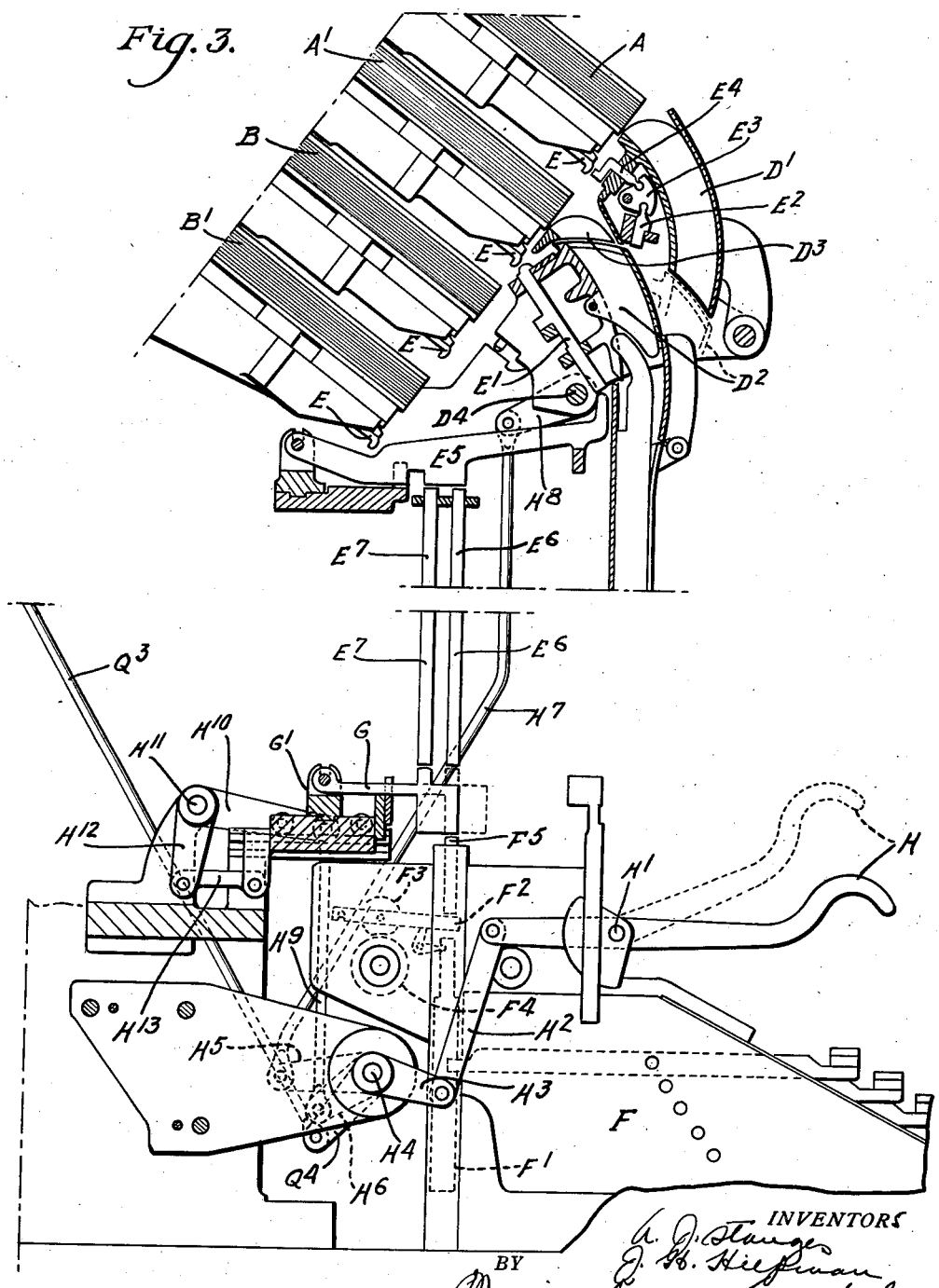
Fig. 3 is a vertical section taken through the assembling and keyboard mechanisms, both of which are shown as connected to the lower magazine of the pair in operative position.
Figure 4:
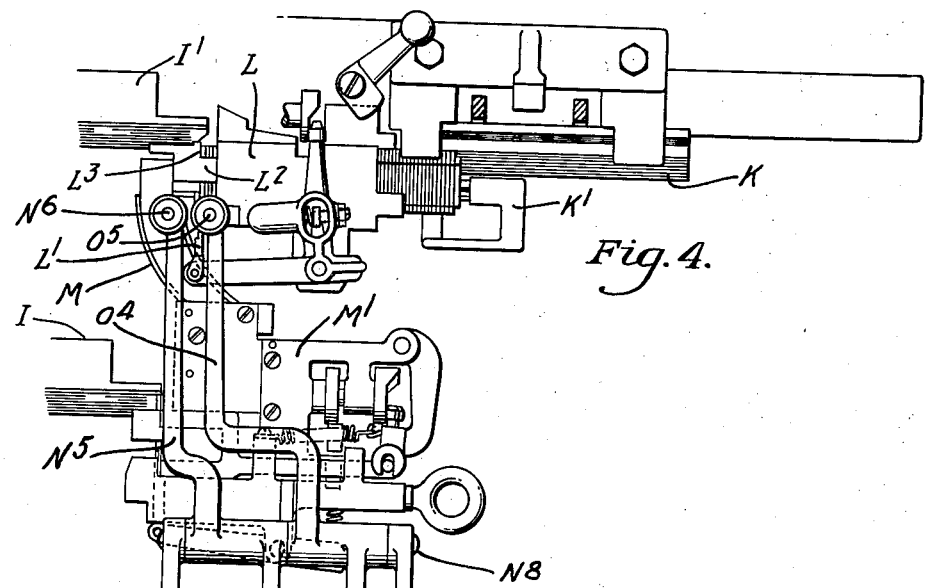
Fig. 4 is a rear view of the parts shown in Fig. 2.
Figure 5:
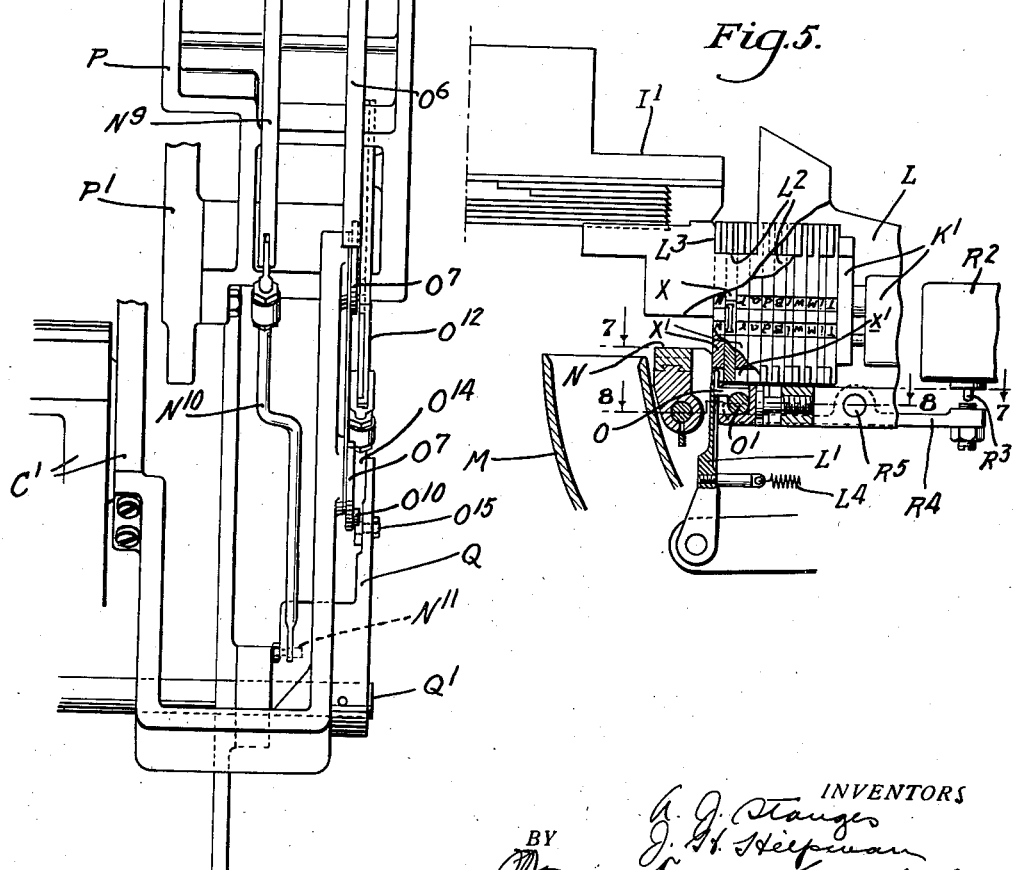
Fig. 5 is a rear view, partly in section, and partly broken away, of the upper distributor box, showing the font distinguisher in register with the notch formed in the leading matrix of the line undergoing distribution.

Referring to Figs. 1 and 3, the machine therein illustrated is equipped with an upper pair of magazines A and $A^1$ and a lower pair of magazines B and $B^1$. The bottom magazines $A^1$ and $B^1$ of the two pairs are of regular or standard form, each being provided with ninety-one grooved channels spaced apart in the usual way to adapt them to contain the ordinary ninety character matrix fonts, one of which may have the form of the matrix $X^1$ shown in Fig. 14, and the other of the form of the matrix $Y^1$ shown in that figure, the difference in form of the two matrices, as will be noted, being due to the difference in location of the notches $x^1$ and $y^1$ formed in their lower ends. The top magazines A and B of the two pairs, while they may be of the same width as the companion magazines $A^1$ and $B^1$, are each formed with seventy-three grooved channels spaced apart in a different manner to adapt them to contain the seventy-two character matrix fonts, one of which may have the form of the matrix X shown in Fig. 14, and the other the form of the matrix Y shown in that figure, the difference in form of these two matrices likewise being due to the difference in location of the notches $x$ and $y$ formed in their lower ends. It is pointed out that the notches $x$ and $y$ of the matrices X and Y not only differ in location as between said matrices, but also differ in location from the notches $x^1$ and $y^1$ of the matrices $X^1$ and $Y^1$.

Figure 2:
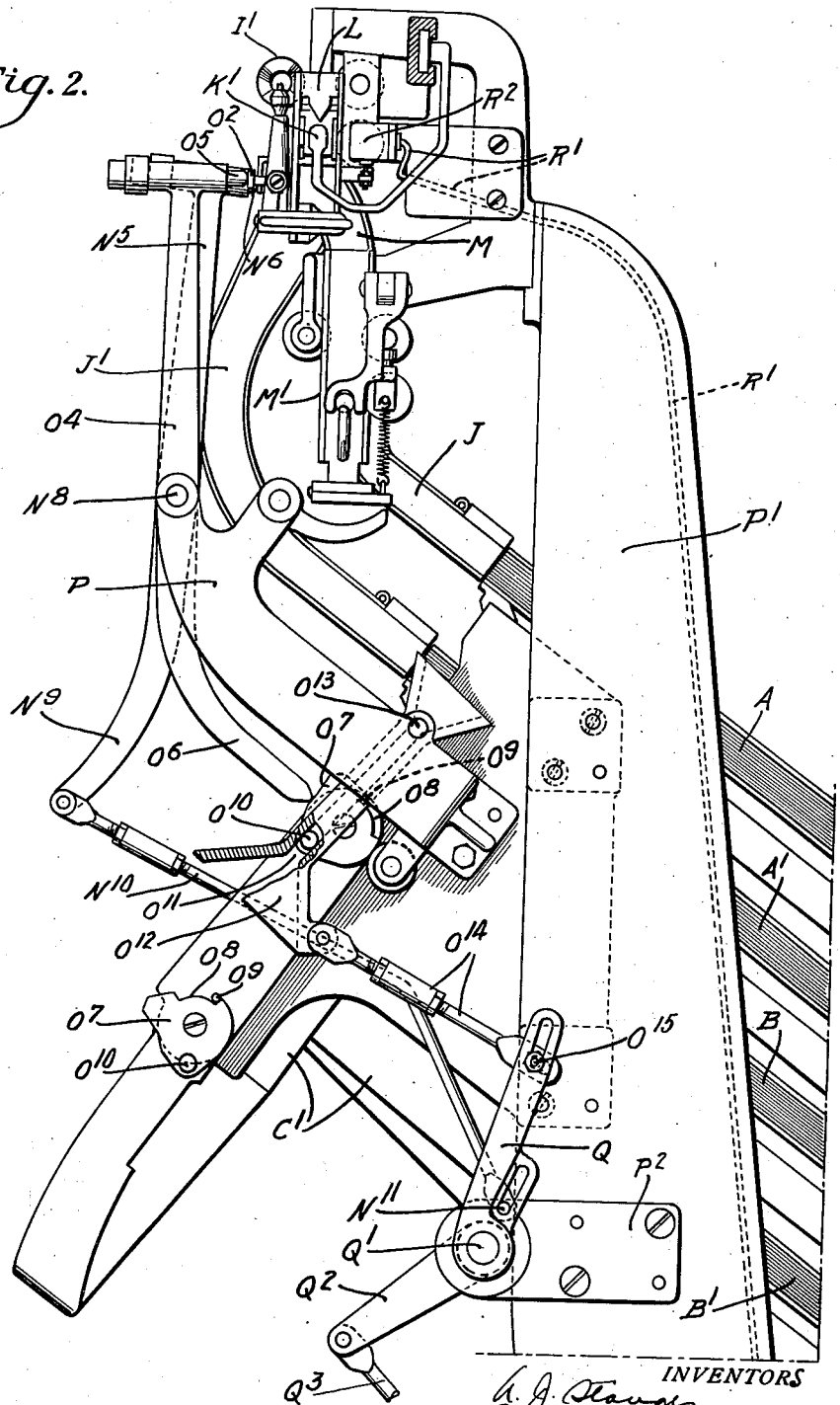
Fig. 2 is a similar view, on a larger scale, of the distributing mechanism, which in this figure is shown in greater detail.

The magazines may be raised and lowered to bring either the upper or the lower pair into operative position, the upper pair being shown in such position in Figs. 1 and 2, and being the pair which will be referred to in the following description. It will be understood, of course, that the same description would apply to the lower pair of magazines were that pair in operative position. The raising and lowering mechanism for the magazines is well known and requires no description, it being enough to say that the mechanism is operated by a hand crank C located within easy reach of the operator while seated at the keyboard.

In order to cooperate with both of the operative magazines, a channeled raceway or front plate D is provided with two channeled throats $D^1$ and $D^2$, the former or upper throat $D^1$ having its guide plates spaced apart to cooperate with the channels in the top magazine A, and the lower throat $D^2$ having its guide plates at their upper ends spaced apart to align with short intermediate guide plates of a fixed bridge $D^3$, said short intermediate guide plates being spaced apart to cooperate with the channels of the bottom magazine $A^1$.

The lower throat $D^2$ is secured to a rock shaft $D^4$ so that it may be swung from the full line position shown in Fig. 3, wherein its guide plates register with the short intermediate guide plates of the bridge $D^3$, to the dotted line position shown in that figure, wherein its guide plates register with the guide plates of the upper throat $D^1$. It will thus be apparent that when the assembler throat $D^2$ occupies said full line position, it will be effective to guide the matrices released from the ninety character font magazine $A^1$ down into the assembler raceway D; whereas when it occupies said dotted line position, it forms a continuation of the assembler throat $D^1$ and will be effective to guide the matrices released from the seventy-two character font magazine A down into the raceway.

Each of the magazines is provided with a series of matrix releasing escapements E adapted to be actuated by a series of slides $E^1$ carried by the pivoted throat $D^2$. When the throat $D^2$ is in the full line position shown in Fig. 3, the slides $E^1$ will cooperate directly with the escapements of the lower magazine $A^1$; whereas when the throat is swung to the dotted line position indicated in Fig. 3, the slides will cooperate with the escapements of the upper magazine A through a series of short slides $E^2$, rocker plates $E^3$ and plungers $E^4$.

The slides $E^1$ are operated through the medium of a series of horizontal levers $E^5$ pivotally mounted at their rear ends and arranged to be acted upon by two series of vertical reeds $E^6$ and $E^7$. The series $E^6$, located at the front, is used when the operator is composing from the upper seventy-two character font magazine A, and the series $E^7$, located at the rear, is used when the operator is composing from the lower ninety character font magazine $A^1$.

The reeds $E^6$ and $E^7$ are in turn operated, as usual, from the keyboard F through the medium of a set of vertical rods $F^1$, each rod adapted to be raised by the depression of the corresponding finger key to release an overlying pivoted cam yoke $F^2$ which, upon release, allows its associated cam $F^3$ to engage a power driven roll $F^4$ in a manner to effect the upward movement of the corresponding one of a series of short vertical bars $F^5$ overlying the cam yokes and slidably arranged in the keyboard frame. The construction and operation of this keyboard mechanism are so well known that any further description would be superfluous. Suffice it to say that, when the short bars $F^5$ are raised by the operation of their respective finger keys, they will through the medium of a series of interposed pivoted levers G (which, it may be stated in passing, are shiftable in a fore-and-aft direction to cooperate with either series of reeds $E^6$ or $E^7$) move the reeds upwardly to effect the release of corresponding matrices from one or the other of the magazines, depending of course upon which series of reeds is active. It will be understood that the escapement actuating slides $E^1$ corresponds in number to the number of channels in the ninety character font magazine $A^1$ (or ninety-one in all), so that some of the slides will be idle when composing from the seventy-two character font magazine A.

As the assembler throat $D^2$ is shifted to its different positions, the interposed pivoted levers G, which are mounted in the fore-and-aft adjustable carriage $G^1$, will be shifted simultaneously therewith to cooperate with the appropriate series of reeds $E^6$ or $E^7$, depending upon which of the magazines is brought into use. In the present instance, such shifting of the assembler throat $D^2$ and pivoted levers G is effected by means of a vertically movable hand lever H, pivoted at $H^1$ in the keyboard frame. At its rear end, the lever H is connected by a link $H^2$ to a crank arm $H^3$ of a transverse rock shaft $H^4$. This rock shaft $H^4$ is provided with two other crank arms $H^5$ and $H^6$ (see also Fig. 13), the crank arm $H^5$ being connected by a long bent link $H^7$ to a crank arm $H^8$ of the rock shaft $D^4$ to which the assembler throat is secured, and the crank arm $H^6$ being connected by a short link $H^9$ to one arm $H^{10}$ of a bell crank lever pivoted at $H^{11}$ in the machine frame and whose other arm $H^{12}$ is connected by a short link $H^{13}$ to the adjustable carriage $G^1$ for the pivoted levers G.

According to the foregoing arrangement, when the hand lever H is pressed down to the full line position shown in Fig. 3, the assembler throat $D^2$ will be swung into register with the lower ninety character font magazine $A^1$ and the pivoted levers G carried back to their rear position to connect the keyboard with the rear series of reeds $E^7$ for the proper release of the matrices from that magazine. On the other hand, when the hand lever H is pulled up to the dotted line position shown in Fig. 3, the assembler throat $D^2$ will be swung into register with the upper seventy-two character font magazine A and the pivoted levers G carried forward to their font position to connect the keyboard with the front series of reeds $E^6$ for the proper release of the matrices from that magazine.

As thus far described, the parts and their mode of operation are or may be substantially the same as set forth in the Frolander Patent No. 2,155,588, except that in the patent the swinging of the assembler throat and the adjustment of the pivoted levers are effected by power means under the control of a finger key, whereas in the embodiment just described these operations are effected manually by the hand lever H having direct connections with the assembler throat and the pivoted lever carriage. It is obvious that the key-controlled power means of the patent could be substituted for the manually operated means herein described if that were desired.

Referring now to the distributing mechanism: There are provided two main or character distributors I and $I^1$; the lower one I being designed to handle matrices of the seventy-two character fonts and connected to the upper magazine A by a relatively short channel entrance J, and the upper one $I^1$ being designed to handle matrices of the ninety character fonts and connected to the lower magazine $A^1$ by a relatively long channel entrance $J^1$. The matrices are delivered to the distributing mechanism by a second elevator K (Fig. 4), from which they are transferred by a distributor shifter or pusher $K^1$ into an upper distributor box L, the shifter also serving to advance the matrices through the box. The distributor box is of standard construction, being equipped with a reciprocating matrix lifting finger $L^1$ and matrix supporting rails $L^2$, presenting vertical shoulders $L^3$ which arrest each leading matrix in engaging relation to the lifting finger. In operation, the lifting finger raises the matrices one by one above the arresting shoulders and into the threads of the conveying screws of the upper distributor $I^1$, which screws carry the detached matrix forward onto the combination bar of the upper distributor or into a chute M leading to a lower distributor box $M^1$ serving the lower distributor I.

The matrices are directed to one distributor or the other by means of a supporting bridge N which is adjustable across the box to different extreme positions. In one position, as shown in Figs. 5 to 8, the bridge N will stand below and give support to the matrices as they are carried forward along the box rails $L^2$, thus directing them to that distributor. In its other position, however, as indicated by the dotted lines in Fig. 10, the bridge will stand out of the path of the matrices and leave them to be supported solely by the box rails $L^2$, which (because they support the matrices at a lower level than the bridge) will allow the matrices to clear the combination bar of the upper distributor and drop them into the chute M leading to the lower distributor.

As thus far described, the distributing mechanism is or may be the same as embodied in commercial machines of the so-called "mixing" type or as shown and described in the Frolander Patent No. 2,155,589, except that, unlike prior constructions, the matrix supporting bridge N is plain-faced or ribless and hence possesses no font selecting function, being employed herein merely to direct the matrices to one or the other of the two distributors according to its adjusted position.

The passage of the matrices through the distributor box is permitted or prevented by an adjustable font distinguisher O arranged at the exit end thereof in position to cooperate with each matrix as it is presented to the lifting finger $L^1$. Thus, if the font distinguisher is set in a position to register with the notch of the leading matrix, as in Fig. 5, such matrix will be allowed to pass and be lifted from the box by the finger $L^1$. On the other hand, if the distinguisher is set in a position out of register with the notch of the leading matrix, as in Fig. 6, such matrix will not be allowed to pass and cannot be lifted from the box by the finger $L^1$, which under such conditions is thrown temporarily out of engaging relation to the leading matrix by the forward rocking of the font distinguisher. Such operation of the font distinguisher, as thus far described, is also well known but, as will presently appear, it is utilized herein in a novel manner for carrying out the present invention, which will now be described.

Since the matrix supporting bridge N possesses no font selecting function, but is relied upon merely to direct the matrices to one or the other of the two distributors, it is proposed to coordinate the adjustment of the font distinguisher with the adjustment of the bridge so that no matrices may pass from the distributor box L unless they belong to the distributor for which the bridge is set. Thus, when the bridge is adjusted to one of its positions, say for directing matrices to the upper ninety character distributor $I^1$, the font distinguisher will be adjusted to a position to register with the notches $x^1$ of the matrices $X^1$, stored in the lower magazine $A^1$, whereas when the bridge is adjusted to its other position, say for directing matrices to the lower seventy-two character distributor I, the font distinguisher will be adjusted to a position to register with the notches $x$ of the matrices X stored in the upper magazine A. If these two fonts of matrices were the only ones required to be handled in the machine, the font distinguisher would, like the bridge, need to be adjusted to only two different positions, but actually other fonts of matrices, such as the matrices Y and $Y^1$ having differently located notches $y$ and $y^1$, will have to be handled in the machine, and hence it is proposed to provide other positions of adjustment for the font distinguisher and still coordinate its adjustment with that of the bridge.

Reverting to the bridge N (see Fig. 10 in particular), it is dove-tailed for sliding adjustment to a fixed supporting block $N^1$ of the upper distributor box L and is connected to a rod $N^2$ passing through the block. A compression spring $N^3$, reacting against the block and pressing against a collar $N^4$ on the rod, tends normally to hold the bridge in its rear or non-matrix-supporting position, as indicated by the dotted lines in Fig. 10. The bridge is moved to and held in its forward or matrix-supporting position by an upright lever $N^5$ provided at its upper end with a yielding spring plunger $N^6$ engaging a lug $N^7$ on the sliding bridge frame (Fig. 7). The lever $N^5$, located at the rear of the machine, is sleeved to a rod $N^8$ of a suitable supporting bracket P secured to the main distributor bracket $P^1$. The sleeve of the lever $N^5$ has a depending arm $N^9$, to the lower end of which is pivoted the rear end of a fore-and-aft connecting link $N^{10}$. The connecting link $N^{10}$ is bent downwardly at its forward end and makes connection with an adjustable pivot stud $N^{11}$ of an arm Q rising from a transverse rock shaft $Q^1$ journalled in suitable supporting brackets $P^2$ secured to the main distributor bracket $P^1$. The arm Q is secured to the rock shaft $Q^1$ at its left end (looking from the front of the machine), and at its right end the rock shaft is provided with another, downwardly extending, arm $Q^2$, which latter arm is connected by a long link $Q^3$ to a third arm $Q^4$ secured to the keyboard rock shaft $H^4$ before alluded to. Through this train of connections, the matrix supporting bridge is adjusted to one or the other of its two positions by the operation of the handle H, which it will be remembered selects one or the other of the two magazines in operative position for use. In other words, when the lower ninety character font magazine $A^1$ is selected, the bridge will be set to direct matrices to the upper distributor $I^1$, and when the upper seventy-two character font magazine A is selected, the bridge will be set to direct matrices to the lower distributor I.

Turning now to the font distinguisher O, it is secured to an adjusting rod $O^1$ slidably arranged in the distributor box and capable of a slight rotation to permit the font distinguisher to rock clear of the leading matrix and to carry the matrix lifting finger $L^1$ out of engaging relation thereto (see Fig. 6). Normally, however, the font distinguisher will occupy its upright position, as in Fig. 5, being held in that position by the spring $L^4$ attached to the matrix lifting finger $L^1$ and which, when the finger is active, holds it in upright position against the usual bearing stop in the distributor box. At its forward end, the rod $O^1$ is provided with a head portion $O^2$, and between this head portion and a relatively fixed part of the box, there is arranged a compression spring $O^3$ which tends constantly to adjust the font distinguisher to the rear. The adjustment of the distinguisher in the opposite direction is effected by a lever $O^4$ arranged alongside of the bridge operating lever $N^5$, before referred to, and sleeved to the same supporting rod $N^8$. At its upper end, the lever $O^4$ is provided with a yielding spring plunger $O^5$ contacting with the head portion $O^2$ of the distinguisher rod $O^1$. The sleeve of the lever $O^4$, like that of the lever $N^5$, is provided with a depending arm $O^6$ which is bent forward (see Fig. 2) to make contact with a rotary cam plate $O^7$ carried by the magazine shift frame $C^1$. This cam plate $O^7$ is formed with a short peripheral recess $O^8$ wherein engages a relatively fixed stop pin $O^9$ on the magazine shift frame to limit the extent of rotation of the plate in opposite directions. Diametrically opposite the recess $O^8$, the cam plate is provided with a laterally projecting pin $O^{10}$ fitting in a groove $O^{11}$ of a member $O^{12}$ hinged near the top, as at $O^{13}$, to the supporting bracket P for swinging movement in a fore-and-aft direction. At its lower end, the swinging member $O^{12}$ is connected by a turn buckle link $O^{14}$ to the upper end of the arm Q before referred to, it being noted that the arm has an adjustable pin $O^5$ playing in an elongated slot formed in the end of the link to provide for a certain amount of lost motion between these parts, for a reason presently to appear.

The train of connections just described provides for the adjustment of the font distinguisher O (like that of the matrix supporting bridge N) by the operation of the magazine selecting hand lever H, that is to say, when the hand lever is operated to select the ninety character font magazine $A^1$, the arm Q will be rocked rearwardly to bring the low portion of the cam $O^7$ into engagement with the lever arm $O^6$ (see Fig. 2) and allow the font distinguisher to be adjusted to its rearward position by the spring $O^3$. On the other hand, when the hand lever is operated to select the seventy-two character font magazine A, the arm Q will be rocked forwardly to bring the high portion of the cam $O^7$ (see Fig. 12) into engagement with the lever arm $O^6$, thus rocking that arm rearwardly and through the lever $O^4$ adjusting the font distinguisher to its forward position.

These forward and rearward positions of the font distinguisher will depend upon the contour of the cam $O^7$ in use. Thus, the upper one of the two cams herein shown will set the font distinguisher in two different positions corresponding to the location of the notches $x$ and $x^1$ of the matrices X and $X^1$ in Fig. 14, while the lower one of the cams will set the distinguisher in two other different positions corresponding to the location of the notches $y$ and $y^1$ of the matrices Y and $Y^1$ in Fig. 14. For other pairs of matrix fonts, the magazine shift frame will be equipped with other and differently contoured cam plates, of which there will be a series, one for each different pair of matrix fonts to be employed in the machine.

In changing back and forth from one pair of magazines A, $A^1$ to the other pair of magazines B, $B^1$, one of the two rotary cam plates shown will be removed from the operating connections and the other substituted in its place—compare Figs. 1 and 12. To provide for this interchange of cam plates, the swinging member $O^{12}$ is formed with funnel shaped ends to flare out the pin groove $O^{11}$ at its opposite ends. At the time of the magazine change, the groove member $O^{12}$ may occupy the rearward position shown in Fig. 2 or the forward position shown in Fig. 12, but in either position the pin $O^{10}$ of the newly selected cam plate will enter the groove $O^{11}$ and turn the cam in one direction or the other to set the font distinguisher in the correct position, just as if the plate had been turned by the swinging of the member itself.

It will now be apparent that, due to their connection with the magazine selecting hand lever H, both the matrix supporting bridge N and the font distinguisher O will be adjusted concurrently and in accord with the matrix font in use. So long as matrices of that font are presented for distribution, they will be permitted to pass the font distinguisher and be directed by the supporting bridge to the corresponding distributor, but when matrices of some other font are presented for distribution, such matrices cannot pass the font distinguisher and the latter will be rocked in the direction of the matrix advance, as in Fig. 6, to throw the lifting finger $L^1$ out of engaging relation to the leading matrix. This condition will obtain until the supporting bridge and the font distinguisher are adjusted to their other position, and assuming the leading matrix to be of the right form for such new setting, it will then pass the font distinguisher and permit the latter to be swung back to its upright position for the continued operation of the lifting finger.

It may happen that, at the time of adjustment, the font distinguisher will stand in a notch of the leading matrix and thus lock the parts against adjustment. To avoid this, means are provided for swinging the font distinguisher forward, independently of the leading matrix, whenever an adjustment is made. Such means, as herein illustrated, comprise a cam piece $N^{12}$ carried by the adjustable matrix supporting bridge N. As a convenient mounting, the cam piece $N^{12}$ is secured to a thin strap $N^{13}$ playing in a slot formed in the supporting block $N^1$ and connected to the actuating rod $N^2$ (see Figs. 8, 9 and 10). Cooperating with the cam piece $N^{12}$ is a pin $O^{17}$ projecting forwardly from a small crank arm $O^{18}$ splined to the font distinguisher supporting rod $O^1$. As will be evident from the drawings, due to the shape of the cam piece $N^{12}$, when the supporting bridge N is adjusted in either direction (slightly in advance of the font distinguisher, as permitted by the lost motion connection before mentioned between the arm Q and the link $O^{14}$), the font distinguisher will be rocked forwardly clear of the leading matrix and throw the lifting finger $L^1$ temporarily out of action. If, at the time the bridge assumes its newly adjusted position, the notch of the leading matrix registers with the font distinguisher (which will have been adjusted concurrently with the bridge, although in the opposite direction), the distinguisher will be restored to its normal upright position and permit the lifting finger to resume action. If, on the other hand, the notch of the leading matrix fails to register with the font distinguisher, the latter will remain rocked forward and will continue to hold the lifting finger out of action until the adjustment of the parts is later reversed.

By these repeated adjustments of the matrix supporting bridge and the font distinguisher, the matrices will be distributed without substantial interruption and without seriously interfering with the work of composition. The frequency of the adjustment will naturally depend upon the composition of the successive lines. For example, of the matrices are being composed alone from one of the magazines, A or $A^1$, the bridge and distinguisher will remain set in position to distribute those matrices to the corresponding distributor X or $X^1$, but when matrices are being composed from both magazines and mixed in the same line (which is the condition represented in Figs. 5 and 6), then the adjustment of the bridge and distinguisher will have to be changed as often as a matrix of different form is presented to the lifting finger. In a large measure, such repeated adjustments of the bridge and distinguisher will be effected as the operator, in composing a given line, is required to shift back and forth from one magazine to the other, and under such conditions it may be said that the adjustment is automatic or at least semi-automatic. There will be times, however, when such automatic adjustment will be inadequate and under those conditions, the operator will be required to make an idle shift from one magazine to the other by the operation of the hand lever H merely to keep up the distribution. This idle magazine shift will not seriously interfere with composition because in many instances only one matrix will have to be distributed (as in Figs. 5 and 6) before the operator can shift back to the magazine from which he desires to compose matrices.

While the stoppage of distribution might be enough to warn the operator in making an idle magazine shift, it is proposed to equip the machine with a flash light R (see Fig. 1) arranged directly before him while seated at the keyboard. This flash light has an electric connection $R^1$ with a switch box $R^2$ secured to the distributor bracket in front of the distributor box L. Protruding from the lower side of the box is a switch plunger $R^3$ arranged to be engaged and actuated by the left end of a lever $R^4$ centrally pivoted, as at $R^5$, to the distributor box and having its right end $R^6$ bearing against a flattened portion $O^{19}$ presented on the underside of a forward extension of the font distinguisher supporting rod $O^1$ (see Figs. 5, 6, 8, 9 and 11). According to this arrangement, whenever the font distinguisher is rocked forward, either by the leading matrix of the line or by the adjustment of the bridge N, the plunger $R^3$ will be raised to close the switch and close the circuit to the flash light R, thus warning the operator that the distribution of the matrices has been temporarily stopped and that a reverse adjustment of the bridge and distinguisher will be necessary to carry on the distribution.

In Fig. 13 there is shown a modification according to which the adjustment of the matrix supporting bridge and the font distinguisher may be effected at the will of the operator without having to make an idle magazine shift or to interfere with the work of composition. In this modification, the rock shaft $Q^1$, which carries the operating arm Q, instead of being connected to the magazine selecting lever H, is instead connected to and operated by a foot treadle S located beneath the keyboard within easy reach of the operator. As a convenient form of connection, the rock shaft is provided with a forwardly extending arm $Q^5$ connected by a Bowden wire $Q^6$ to the foot treadle near the forward end of the latter. In this instance, the matrix supporting bridge and the font distinguisher will normally occupy adjusted positions corresponding to the ninety character matrix font stored in the lower magazine $A^1$, being held in such positions by their actuating springs $N^3$ and $O^3$, respectively. To reverse the adjustment of the bridge and distinguisher for the matrices of the seventy-two character font stored in the upper magazine A, the operator need merely depress the foot treadle S and hold it depressed until a new signal is given by the flash light R. Thereupon the operator needs merely to release the foot treadle and the parts will return to their original setting, the foot treadle being raised by an actuating spring $S^1$. In this modification, as will be understood, the adjustment of the matrix supporting bridge and font distinguisher will be wholly manual, although, with the aid of the flash light R, the operator may alter the adjustment as frequently as necessary and without interfering seriously, if at all, with the work of composition.

In the second embodiment of the invention illustrated in Figs. 16 to 20, the two distributors I and $I^1$ are arranged at the same level and are connected by the channel entrances J and $J^1$ to their respective magazines A and $A^1$. In this instance, however, the matrices are directed to one distributor or the other by means of a single distributor box 1 which, in known manner, is arranged to be swung about a hinge pin 2 into operative relation to either selected distributor. Such swinging of the box may be effected from the magazine selecting hand lever H in the embodiment first described, or by the foot treadle S in the modification shown in Fig. 13. Connection to one or the other of these manually operated parts may be by means of a link 3 pivoted to a crank arm 4 on a transverse rock shaft 5 similar in mounting and location to the rock shaft $Q^1$ of the first embodiment. At its left end, the rock shaft 5 is provided with a second crank arm 6 connected by a vertical link 7 to one arm 8 of a bell crank lever pivoted at 9 to the distributor bracket. The other arm 10 of the bell crank lever is connected by a short fore-and-aft link 11 to the distributor box.

The distributor box 1 (like the distributor box L of the first embodiment) is provided with a matrix lifting finger $L^1$, as well as with an adjustable font distinguisher O, which latter, except for its mode of operation, is similar in all respects to the font distinguisher of the first embodiment.

The adjustment of the font distinguisher O in the instant embodiment is effected by the swinging movements of the distributor box. Thus, as shown in Figs. 17 and 20, when the box is adjusted to its rearward position to cooperate with the rear distributor $I^1$, the font distinguisher O will be adjusted to a position to register with the notches $x^1$ of the matrices $X^1$ stored in the lower or ninety character font magazine $A^1$; whereas when the box is adjusted to its forward position, as shown in Fig. 19, the font distinguisher will be adjusted to a position to register with the notches $x$ of the matrices X stored in the upper or seventy-two character font magazine A. These adjustments of the font distinguisher to one or the other of its two positions, are effected by a pair of abutment pins 12 and 13 mounted in the distributor bracket and arranged to engage and operate a sliding rod 14 carried by the box. The rod 14, at opposite sides of the box, is provided with collars 15 and 16, against which press oppositely acting springs 17 and 18 reacting against the sides of the box. These two springs 17 and 18 are of equal strength and tend to hold the rod 14 in a central or neutral position in the box as shown in Fig. 18, but when the box is adjusted to one or the other of its extreme positions, the rod 14 will be slid in the opposite direction against the opposition of the springs, compressing one and expanding the other (compare Figs. 17 and 19). At its forward end, the rod 14 is also provided with a grooved collar 19 connected by a small walking beam 20 to a similar grooved collar 21 on the font distinguisher supporting rod $O^1$. The walking beam 20 is supported by a bracket 22 extended forwardly from the distributor box. The distinguisher rod $O^1$, like the rod 14, is also provided with two oppositely acting compression springs 23 and 24 which (see Fig. 18) tend to maintain it in a central or neutral position. Both of these springs react against the collar 21, the spring 23 pressing rearwardly on the rod $O^1$ against a collar 25 thereon, and the spring 24 pressing forwardly on the rod against a collar 26 thereon. It will now be apparent that when the rod 14 is urged forwardly by the abutment pin 12, when the box is adjusted to its rearward position as in Fig. 17, the font distinguisher rod $O^1$ will be moved in the opposite direction to locate the font distinguisher O in one of its adjusted positions, and that when the rod 14 is urged rearwardly by the abutment pin 13, when the box is adjusted to its forward position as in Fig. 19, the font distinguisher rod $O^1$ will be moved in the opposite direction to locate the font distinguisher O in its other adjusted position. These two adjusted positions of the font distinguisher are determined by another pair of abutment pins 27 and 28 mounted in the distributor bracket in position to engage the rod $O^1$ as it is moved in opposite directions by the rod 14 in the manner just described. The pins 27 and 28 constitute one pair only of a series of pairs presented by rotary adjustable wheels 29 and 30, respectively, on the distributor bracket. As will be understood, the wheels 29 and 30 will be adjusted at the outset to bring into action a pair of pins suitable to locate the font distinguisher in positions corresponding to the location of the notches formed in the matrices of the two operative magazines, these matrices, as before stated, being the matrices X and X¹ of Fig. 14. The stop pins 28 and 29 vary in height and can be paired off to correspond to whatever pair of matrix fonts is in use. No provision has been made for adjusting the wheels 29 and 30 automatically, as might be desirable when the machine is equipped with two separate pairs of magazines, but this is a detail which could be left to any good machine designer.

During the shifting of the distributor box I, as during the shifting of the matrix supporting bridge N of the first embodiment, the font distinguisher O will be rocked forwardly to throw the lifting finger L¹ temporarily out of action, and this is accomplished by providing the sliding rod 14 with a cam piece 31 which (like the cam piece N¹² of the first embodiment) will engage and operate the crank arm O¹⁸ splined to the distinguisher rod O¹ (see Fig. 18).

It is also pointed out that, in this second embodiment, the machine will be equipped with the flash light R before described as a signal to the operator whenever the font distinguisher is rocked forward, either by the adjustment of the distributor box or by the leading matrix whose notch fails to register with the font distinguisher. In this instance, however, the switch box R² is mounted directly on the swinging distributor box, as is the switch operating lever R⁴ actuated by the flattened portion O¹⁹ of the distinguisher rod O¹.

In view of the rather full description of the first embodiment, it is believed any further description of the second embodiment would be superfluous, it being apparent that the principal difference between the two embodiments resides in the fact that the adjustable distributor box of the second embodiment takes the place of the adjustable matrix supporting bridge of the first embodiment.

While two different embodiments of the invention have been herein illustrated, it is obvious that other embodiments could be provided for the practice of the invention. It should be understood, therefore, that the two illustrated embodiments are representative only and have been chosen because, one has special application to a certain well known type of machine, while the other has special application to another well known type of machine. And it hardly needs to be added that many of the details of construction herein shown and described could be variously modified and still be comprised within the scope of the invention. It should be understood, therefore, that the invention is not limited to any particular form or embodiment except insofar as such limitations are specified in the appended claims.

Having thus described our invention, what we claim is:

1. A typographical distributing mechanism including, in combination, two fixed main or character distributors for matrices of different forms, adjustable means arranged in advance of said distributors for directing the matrices to either selected distributor, and concurrently adjustable means for permitting the passage to the selected distributor of matrices destined for that distributor while preventing the passage thereto of matrices destined for the other distributor.

2. A typographical distributing mechanism including, in combination, two fixed main or character distributors, one adapted for matrices of one form and the other for matrices of a different form, adjustable means arranged in advance of said distributors for directing the matrices to first one distributor and then the other alternately for the distribution of lines containing matrices of both forms, and concurrently adjustable means adapted under one condition of adjustment to permit the passage to the selected distributor of matrices of one form while preventing the passage thereto of matrices of the other form, and under another condition of adjustment to permit the passage to the newly selected distributor of matrices of the second form while preventing the passage thereto of matrices of the first form, and so on with each change of distributors.

3. A typographical distributing mechanism according to claim 1, wherein the adjustable matrix directing means is in the form of a matrix supporting bridge which in one position causes the matrices to pass at an upper level to one distributor and in another position causes them to pass at a lower level to the other distributor.

4. A typographical distributing mechanism according to claim 1, wherein the adjustable matrix directing means is in the form of a hinged distributor box which in one position cooperates with one distributor and in another position cooperates with the other distributor.

5. A typographical distributing mechanism according to claim 1, wherein the adjustable means controlling the passage of the matrices to the distributors is in the form of a font distinguisher which is adjustable to different positions to cooperate with differently located notches formed in the matrices.

6. A typographical distributing mechanism according to claim 1, including a device for feeding the matrices one by one to the selected distributor, and wherein said feeding device is rendered momentarily inoperative whenever the passage of matrices is prevented.

7. A typographical distributing mechanism according to claim 1, including a device for feeding the matrices one by one to the selected distributor, and wherein said feeding device is rendered momentarily inoperative during a change of distributors.

8. A typographical distributing mechanism according to claim 1, including a signalling device which is rendered operative whenever the passage of matrices is prevented.

9. A typographical distributing mechanism according to claim 1, including a signalling device which is rendered operative during each change of distributors.

10. A typographical distributing mechanism according to claim 1 as embodied in a machine equipped with two magazines into which the matrices of the two different forms are distributed, and wherein the distributor selection is controlled automatically by the shifting of the keyboard control from one magazine to the other.

11. A typographical distributing mechanism according to claim 1 as embodied in a machine equipped with different pairs of magazines, into one of which pairs the matrices of the two different forms are distributed, and wherein the adjustable means for controlling the passage of the matrices to the distributors is automatically controlled in its range of adjustment by the selection of a given pair of magazines in accordance with the forms of the matrices therein contained.

12. A typographical distributing mechanism according to claim 1, wherein the distributor 13. A typographical distributing mechanism according to claim 1, wherein the adjustable means for controlling the passage of the matrices to the distributors is settable to distinguish between any two forms of matrices of a variety of different forms.

14. A typographical distributing mechanism according to claim 1, wherein the adjustable means for controlling the passage of the matrices to the distributors is in the form of a font distinguisher which in one position registers with notches formed in a given location in the matrices destined for one distributor and which in a second position registers with notches formed in another location in the matrices destined for the other distributor.

15. A typographical distributing mechanism according to claim 1, wherein the adjustable means for controlling the passage of the matrices to the distributors is in the form of a font distinguisher which in one position registers with notches formed in a given location in the matrices destined for one distributor and which in a second position registers with notches formed in another location in the matrices destined for the other distributor, characterized in that the font distinguisher is adjusted to one or the other of its two different positions by a rotatable cam specially contoured to accord with the two different forms of matrices to be distributed.

16. A typographical distributing mechanism according to claim 1, wherein the adjustable means for controlling the passage of the matrices to the distributors is in the form of a font distinguisher which in one position registers with notches formed in a given location in the matrices destined for one distributor and which in a second position registers with notches formed in another location in the matrices destined for the other distributor, characterized in that the font distinguisher is adjusted to one or the other of its two different positions by a rotatable cam specially contoured to accord with the two different forms of matrices to be distributed, said cam being replaceable by a substitute cam specially contoured to accord with two other different forms of matrices to be distributed.

17. A typographical distributing mechanism according to claim 1, wherein the adjustable means for controlling the passage of the matrices to the distributors is in the form of a font distinguisher which in one position registers with notches formed in a given location in the matrices destined for one distributor and which in a second position registers with notches formed in another location in the matrices destined for the other distributor, characterized in that the font distinguisher is adjusted to one or the other of its two different positions by a rotatable cam specially contoured to accord with the two different forms of matrices to be distributed, said cam being rotated automatically with each distributor selection to locate the font distinguisher in one or the other of its two different positions.

18. A typographical distributing mechanism according to claim 1 as embodied in a machine equipped with two different pairs of magazines, either of which may be brought into operative relation to the two distributors, and wherein the adjustable means for controlling the passage of the matrices to the distributors is in the form of a font distinguisher which in one position registers with notches formed in a given location in the matrices destined for one distributor and which in a second position registers with notches formed in another location in the matrices destined for the other distributor, characterized in that the font distinguisher is adjusted to one or the other of its two different positions by a rotatable cam specially contoured to accord with the two different forms of matrices to be distributed, and characterized further in that there are two rotatable cams, one for each pair of magazines, which are alternately selected as a change is made from one pair of magazines to the other.

19. In a typographical distributing machine equipped with a pair of magazines containing matrices of different fonts, said matrices occupying differently located channels according to character in the respective magazines, a keyboard, means for connecting the finger keys of the keyboard to the appropriate channels of either selected magazine, the combination of two fixed main or character distributors for distributing the matrices of the different fonts into their respective magazines, adjustable means for directing the matrices to one or the other of the two distributors, and concurrently adjustable means for permitting the passage to the selected distributor of matrices of one font while preventing the passage thereto of matrices of the other font.

20. In a typographical distributing machine equipped with a pair of magazines containing matrices of different fonts, said matrices occupying differently located channels according to character in the respective magazines, a keyboard, means for connecting the finger keys of the keyboard to the appropriate channels of either selected magazine, the combination of two fixed main or character distributors for distributing the matrices of the different fonts into their respective magazines, adjustable means for directing the matrices to one or the other of the two distributors, concurrently adjustable means for permitting the passage to the selected distributor of matrices of one font while preventing the passage thereto of matrices of the other font, and connections between both said adjustable means and the keyboard connecting means whereby the selection of either magazine will bring about the selection of the corresponding distributor.

21. In a typographical distributing machine equipped with two pairs of magazines containing matrices of different fonts, the matrices of each pair of magazines occupying differently located channels according to character, means for shifting the magazines to bring either pair of magazines into operative position, a keyboard, and means for connecting the finger keys of the keyboard to the appropriate channels of either selected magazine of the pair in operative position, the combination of two fixed main or character distributors for distributing the matrices of the corresponding fonts into the magazines of the pair in operative position, adjustable means for directing the matrices to one or the other of the two distributors, and concurrently adjustable means for permitting the passage to the selected distributor of matrices of one font while preventing the passage thereto of matrices of the other font, the setting of the last mentioned adjustable means to distinguish between the two matrix fonts to be distributed being effected automatically as the corresponding magazine pair is brought into operative position.

22. A typographical distributing mechanism for matrices formed in their bottom edges with font distinguishing notches including, in combination, two main or character distributors, one adapted for matrices having their notches in one location and the other for matrices having their notches in a different location, a matrix supporting bridge adjustable to either one of two different positions for directing the matrices to one distributor or the other as required, a font distinguisher likewise adjustable to either one of two different positions, in one position to permit the passage to the selected distributor of matrices with notches of one location by registering with said notches, while preventing the passage thereto of matrices with notches of the other location by failing to register with said notches, and in the other position to permit the passage to the newly selected distributor of matrices with notches of the second-mentioned location by registering with said notches, while preventing the passage thereto of matrices with notches of the first-mentioned location by failing to register with said notches, and means to insure the corresponding adjustment of the bridge and font distinguisher.

23. A typographical distributing mechanism including, in combination, two main or character distributors adapted to distribute matrices formed in their bottom edges with differently located notches, an adjustable distributor box for directing the matrices to one or the other of the two distributors, a font distinguisher carried by the box and adjustable to different positions therein to register with the differently located notches of the matrices, and means to insure the corresponding adjustment of the box and font distinguisher.

24. A typographical distributing mechanism for matrices formed in their bottom edges with font distinguishing notches including, in combination, two main or character distributors, one adapted for matrices having their notches in one location and the other for matrices having their notches in a different location, a matrix supporting bridge adjustable to either one of two different positions for directing the matrices to one distributor or the other as required, a font distinguisher likewise adjustable to either one of two different positions, in one position to permit the passage to the selected distributor of matrices with notches of one location by registering with said notches, while preventing the passage thereto of matrices with notches of the other location by failing to register with said notches, and in the other position to permit the passage to the newly selected distributor of matrices with notches of the second-mentioned location by registering with said notches, while preventing the passage thereto of matrices with notches of the first-mentioned location by failing to register with said notches, means to insure the corresponding adjustment of the bridge and font distinguisher, and a matrix lifting finger for feeding any matrices which pass the font distinguisher to the selected distributor, said finger being temporarily thrown out of action by the yielding of the font distinguisher when the latter fails to register wtih the notch in the leading matrix presented for distribution.

25. A typographical distributing mechanism including, in combination, two main or character distributors adapted to distribute matrices formed in their bottom edges with differently located notches, an adjustable distributor box for directing the matrices to one or the other of the two distributors, a font distinguisher carried by the box and adjustable to different positions therein to register with the differently located notches of the matrices, means to insure the corresponding adjustment of the box and font distinguisher, and a matrix lifting finger also carried by the distributor box for feeding to the selected distributor any matrices which pass the font distinguisher, said finger being temporarily thrown out of action by the yielding of the font distinguisher when the latter fails to register with the notch in the leading matrix presented for distribution.

26. A typographical distributing mechanism including, in combination, two main or character distributors adapted to distribute matrices formed in their bottom edges with differently located notches, an adjustable matrix supporting bridge for directing the matrices to one or the other of the two distributors, a font distinguisher adjustable to different positions to register with the differently located notches of the matrices, means to insure the corresponding adjustment of the bridge and font distinguisher, and an electric signal switch actuated by the yielding of the font distinguisher.

27. A typographical dsitributing mechanism including, in combination, two main or character distributors adapted to distribute matrices formed in their bottom edges with differently located notches, an adjustable distributor box for directing the matrices to one or the other of the two distributors, a font distinguisher carried by the box and adjustable to different positions therein to register with the differently located notches of the matrices, means to insure the corresponding adjustment of the box and font distinguisher, and an electric signal switch also carried by the distributor box and actuated by the yielding of the font distinguisher.

28. A typographical distributing mechanism according to claim 24, including automatic means actuated each time the font distinguisher is adjusted to rock it forward preliminarily whenever it stands in register with the notch of the leading matrix presented for distribution.

29. In a typographical distributing machine equipped with a pair of magazines containing matrices of different fonts and with two distributors, one for each magazine, the combination of means for selecting one or the other of the magazines for use, an adjustable plain-faced or ribless matrix supporting bridge for directing the matrices to one or the other of the distributors, and means whereby the selection of either magazine will cause the supporting bridge to direct the matrices to the corresponding distributor.

30. A typographical distributing mechanism including, in combination, two main or character distributors, and means for directing the matrices to one or the other of the distributors, said means being in the form of a plain-faced or ribless matrix supporting bridge adjustable alternatively to a matrix-supporting position or a non-matrix-supporting position according to the distributor to be selected.

31. A typographical distributing mechanism including, in combination, a distributor box, a matrix lifting finger for feeding the matrices therefrom, said finger being adapted to be thrown temporarily out of action whenever a matrix of improper form is presented thereto, and a signalling device actuated by the temporary disabling of the lifting finger.

32. A typographical distributing mechanism including, in combination, a distributor box, a font distinguisher to permit or prevent the passage of matrices therethrough according to form, and a signalling device actuated by the font distinguisher whenever the passage of matrices through the box is prevented.

33. A typographical distributing mechanism including, in combination, a distributor box, a font distinguisher adjustable to one or the other of two predetermined positions in controlling the passage through the box of matrices of a given pair of fonts, and means for altering said predetermined positions of the font distinguisher, whereby it may be adapted to cooperate with a different pair of matrix fonts.

34. A typographical distributing mechanism according to claim 25, including automatic means actuated each time the font distinguisher is adjusted to rock it forward preliminarily whenever it stands in register with the notch of the leading matrix presented for distribution.

ANTHONY J. STOUGES.
JOHN H. HILPMAN.